W. S. BEVERS, Jr.
COMBINED RAT AND MOUSE TRAP.
APPLICATION FILED APR. 26, 1915.
1,174,808.
Patented Mar. 7, 1916.
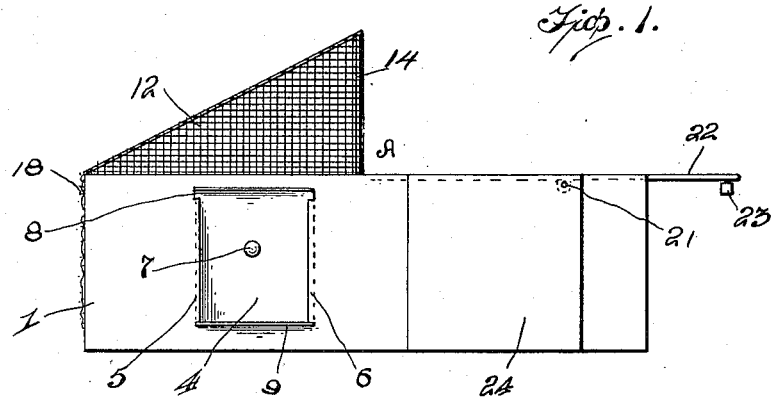
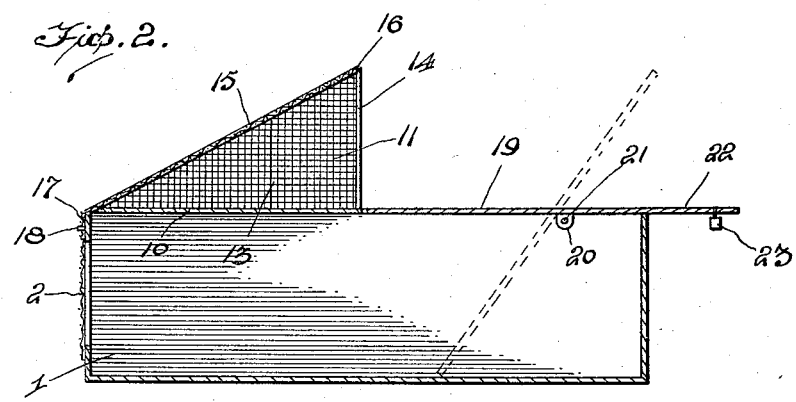
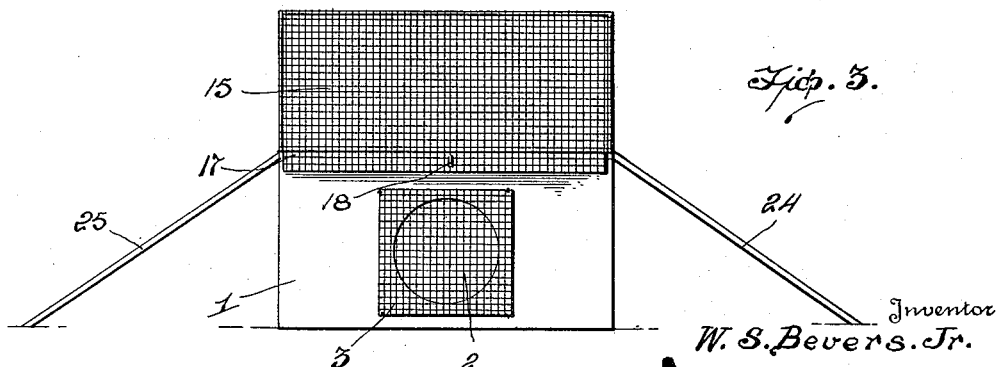

UNITED STATES PATENT OFFICE.

WILLIAM S. BEVERS, JR., OF LAKEVIEW, TEXAS.

COMBINED RAT AND MOUSE TRAP.

1,174,808.  Specification of Letters Patent.  Patented Mar. 7, 1916.

Application filed April 26, 1915. Serial No. 23,921.

*To all whom it may concern:*

Be it known that I, WILLIAM S. BEVERS, Jr., a citizen of the United States, residing at Lakeview, in the county of Hall and State of Texas, have invented certain new and useful Improvements in Combined Rat and Mouse Traps; and I do hereby declare the following to be a full, clear, and exact description of the invention, such as will enable others skilled in the art to which it appertains to make and use the same.

One object of this invention is to provide a trap which will be cheaply constructed, effective in operation, and one that will admit of the confinement and displayment of live bait therein, in such a manner that the animals cannot get at the bait.

Another object is to provide a trap having a sight opening in one wall thereof, which opening is covered with suitable material, such as wire fabric, so that the interior of the trap can always be viewed from the exterior for determining whether or not any animals are imprisoned within the trap.

A further object of the invention is to provide a trap from which it will be impossible for animals to escape after they have been captured.

With the above and other objects in view as will more fully appear from that embodiment of my invention of which the following is a specification, reference is had to the accompanying drawings forming a part thereof, in which:—

Figure 1 is a side elevation of the trap. Fig. 2 is a longitudinal sectional elevation of the same, and Fig. 3 is an end view thereof.

Referring to the drawings more in detail, the letter A designates as an entirety, the trap which includes a rectangular housing 1 formed preferably of galvanized iron, one of the end walls of the housing having a sight opening 2 therein which is covered by wire netting 3 so that the interior of the trap may be readily viewed from the outside. One side of the housing is provided with a door opening for the accommodation of a vertically sliding door 4, the opposite side edges of the said door being slidably received by guide grooves 5 and 6 formed in the opposite sides of the door opening. The door 4 is provided with a manipulating handle 7 and has its upper end bent outwardly to provide a flange 8. The lower wall of the door opening has formed thereon an outwardly extending flange 9, which underlies the flange 8 on the door and against which the lower end of the door is adapted to engage when the door is in closed position, as shown in Fig. 1. The body 1 is provided with a fixed top wall 10, which extends from the end of the housing in which the sight opening 2 is formed, to a point substantially half the length of the housing.

Mounted upon the wall 10 is a bait chamber 11, which chamber includes the side walls 12 and 13 and are formed of mesh wire, and an end wall 14 formed of the same material of which the side walls are formed. The side walls 12 and 13 have their upper edges inclined, as shown in Figs. 1 and 2 and form a rest for a vertically swinging door 15. This door 15 has one end hingedly secured as at 16 to the upper edge of the end wall 14, and its opposite end adapted, when the door is closed to rest upon the adjacent edge of the top wall 10 of the housing, the said last mentioned end of the door being terminally bent downwardly and provided with an eye, adapted to engage the bolt or staple 18 mounted in the adjacent end wall of the housing 1.

Mounted upon the top of the housing 1 is an inwardly swinging trap door 19. This door is provided at a point substantially half way between its opposite ends, with a pair of spaced downwardly projecting ears 20, which are adapted to be pivotally secured to the sides of the housing 1 by means of the pivot pins 21. The door 19 when in closed position lies substantially flush with the top wall 10 of the body 1 and said door has one end thereof extending beyond one of the end walls of the body, as shown at 22. This extension 22 carries a weight 23, which is adapted to return the door to its normally closed position after the same has been operated. The body 1 is provided at opposite points thereof with inclined runways 24 and 25, which provide means whereby the animals can readily ascend to the trap door 19.

From the above description it will be seen that when the animals ascend the inclined ways 24 and 25, and step upon the trap door 19, the latter will give way and swing downwardly under the weight of the animals, resulting in deposit of the animals within the body or housing 1.

By forming the bait chamber of mesh wire and having the door lying at an incline as shown in Figs. 1 and 2 of the drawings, it will be obvious that the bait contained within the chamber will be visible from all sides of the trap. Inasmuch as it is impossible for the animals to get at the bait, it will be seen that the same bait may be used indefinitely. From the above it will be seen that I have provided a cheap and effective trap, that will display the bait, in such manner, that the same may be viewed from any side of the trap; one that the interior thereof will be open to view so as to determine, if there are any animals imprisoned therein, without the necessity of opening any doors, and one that will prevent the escape of the trapped animals.

What I claim as new is:—

A trap comprising, a housing having its upper side provided with a trap door, a bait chamber mounted upon the upper side of the housing and adjacent the trap door, and formed of mesh wire and including opposite side walls and an end wall, said side walls having their upper edges inclined and a vertically swinging door formed of mesh wire with one end hingedly connected to the said wall and having its opposite end provided with a depending flange, the said door adapted to engage the upper inclined edges of the side walls, so as to close the bait chamber, and when in closed position to have the depending flange engage over the adjacent end wall, and fastening means carried by the said adjacent end wall and engaging the flange for holding the door against accidental opening.

In testimony whereof I affix my signature in presence of two witnesses.

WILLIAM S. BEVERS, Jr.

Witnesses:
W. L. ALLEN,
S. S. MONTGOMERY.

Copies of this patent may be obtained for five cents each, by addressing the "Commissioner of Patents, Washington, D. C."